US00RE40254E

(19) United States
(12) Reissued Patent
Nikula et al.

(10) Patent Number: US RE40,254 E
(45) Date of Reissued Patent: Apr. 22, 2008

(54) METHOD AND SYSTEM FOR REALISING A FAST CONTROL CHANNEL IN A CELLULAR RADIO NETWORK

(75) Inventors: Eero Nikula, Espoo (FI); Harri Jokinen, Hiisi (FI); Hannu Vilpponen, Tampere (FI)

(73) Assignee: Nokia Corporation, Espoo (FI)

(21) Appl. No.: 11/593,126

(22) Filed: Nov. 3, 2006

Related U.S. Patent Documents

Reissue of:
(64) Patent No.: 7,031,334
Issued: Apr. 18, 2006
Appl. No.: 09/518,110
Filed: Mar. 3, 2000

(30) Foreign Application Priority Data

Mar. 3, 1999 (FI) ..... 990457

(51) Int. Cl.
*H04B 7/212* (2006.01)

(52) U.S. Cl. ..... 370/442; 370/280; 370/207; 370/522; 370/496; 370/329; 370/465; 375/260; 375/268; 375/272; 375/298; 375/323

(58) Field of Classification Search ..... None
See application file for complete search history.

(56) References Cited

U.S. PATENT DOCUMENTS 5,182,753 A 1/1993 Dahlin et al. ..... 371/43
5,499,246 A 3/1996 Cooper ..... 370/95.1
6,125,148 A * 9/2000 Frodigh et al. ..... 375/261
6,456,627 B1 * 9/2002 Frodigh et al. ..... 370/465

FOREIGN PATENT DOCUMENTS

| | | |
|---|---|---|
| CN | 1278379 A | 12/2000 |
| EP | 0651523 A | 5/1995 |
| GB | 2260245 A | 4/1993 |
| WO | WO 98/09391 | 3/1998 |
| WO | WO 99/12283 | 3/1999 |

OTHER PUBLICATIONS

WO 99/12283 corresponds to CN 1278379A and was previously submitted.*

* cited by examiner

*Primary Examiner*—Raj K. Jain
(74) *Attorney, Agent, or Firm*—Perman & Green, LLP

(57) ABSTRACT

Signalling information is conveyed from a transmitting device (101) to a receiving device (102) in a cellular radio network where user data transmission takes place on a traffic channel in discrete transmission bursts (111-120; 211-220; 310-313) consisting of consecutive symbols. A piece of signalling information is formatted into symbols which are transmitted as a block of consecutive symbols (FACCH) in a certain transmission burst of a traffic channel. It is also indicated within said certain transmission burst that it contains symbols carrying signalling information.

19 Claims, 4 Drawing Sheets

METHOD AND SYSTEM FOR REALISING A FAST CONTROL CHANNEL IN A CELLULAR RADIO NETWORK

Matter enclosed in heavy brackets [ ] appears in the original patent but forms no part of this reissue specification; matter printed in italics indicates the additions made by reissue.

TECHNOLOGICAL FIELD

The invention concerns the mapping of such logical channels into the physical channel arrangement in a cellular radio network that are not continuously needed but only used to convey some urgent control information according to need.

BACKGROUND OF THE INVENTION

In the well-known GSM (Global System for Mobile communications) there has been specified the so called FACCH or Fast Associated Control CHannel which is used for example to indicate the call establishment progress, to authenticate a subscriber or to command a handover. It is common to these "fast" signalling needs that all delays should be minimized and the conveyed information should be received over the radio interface as faultlessly as possible. As a background to the present invention we will shortly describe the known properties of a FACCH. A detailed description is found for example in the technical specifications number GSM 05.01, GSM 05.02 and GSM 05.03 published by the European Tele-communications Standards Institute.

The FACCH actually involves the use of the burst structure on a regular TCH or Traffic CHannel to temporarily convey "fast" signalling information instead of user data. The transmitting device packs the desired fast signalling information into an FACCH frame which, after channel coding, consists of 456 bits. At the interleaving stage the FACCH frame is split into 8 groups of 57 bits. The bits of the first group are transmitted in the even bit positions of a certain Nth transmission burst and the bits of the next groups go to the even bit positions of the next transmission bursts until the bits of the fourth group are transmitted in the even bit positions of the (N+3)th transmission burst. The bits of groups 5 to 8 are then transmitted in the odd bit positions of the transmission bursts N+4 to N+7 respectively. Certain stealing flags (i.e. indicator bits) are used within each transmission burst to indicate whether the even (or odd) bit positions of that particular transmission burst contain user data or fast signalling information. In other words the FACCH frame will be conveyed to the receiving device by using every second bit position in 8 consecutive transmission bursts of a certain traffic channel. If there is only one FACCH frame to be transmitted, all the other bit positions are used to convey user data.

As an example of the extensions to and developments over the existing cellular radio networks we will describe the proposed Enhanced Circuit Switched Data or ECSD arrangement which is currently being specified as a part of the Enhanced Data rates for GSM Evolution or EDGE programme. ECSD is based on enhancing the effective user data rates over the radio interface by employing 8-level Phase Shift Keying (8-PSK) as an alternative to the Gaussian Minimum Shift Keying or GMSK modulation method of GSM. A straightforward solution for implementing the fast signalling channels within ECSD would be to copy the above described method as closely as possible. In other words the information contents of an FACCH frame would be distributed selectively to the even and odd symbol positions in the 8-PSK modulated transmission bursts, and stealing flag symbols would be used to indicate the nature of the contents of each transmission burst.

However, one must note that 8-PSK as a modulation method requires a higher bit energy over noise density ratio (commonly referred to as Eb/N0) than GMSK to achieve a certain required level of faultlessness in the received information. It is therefore expected that simply adopting the GSM FACCH mechanisms in ECSD would lead to inadequate performance for the FACCH.

A proposed solution is to otherwise adopt the GSM practice but to use different detection metrics for the user data and fast signalling information, i.e. to effectively employ binary modulation like GMSK or BPSK (Binary Phase Shift Keying) for the FACCH symbols. This solution is unattractive from the receiver designer's point of view, because it would require a receiver to be able to detect every other symbol in a symbol sequence with a different detection algorithm. Another solution is to use a completely different physical channel with different channel specifications for conveying the fast signalling information, but this alternative tends to lead into complicated hardware structures.

SUMMARY OF THE INVENTION

It is an object of the present invention to provide a method and an arrangement for combining the transmission of fast signalling information to the transmission of user data in a multilevel modulation environment without sacrificing the performance of the logical signalling channel and without introducing a high level of complexity to the transmitter and receiver arrangements.

The objects of the invention are achieved by packing the fast signalling information into continuous blocks of the transmission bursts at the interleaving stage and using a less sensitive modulation method for the transmission of fast signalling information than for user data.

The method according to the invention is characterized in that it comprises the steps of

- formatting a piece of signalling information into symbols,
- transmitting the symbols carrying the signalling information as a block of consecutive symbols in a certain transmission burst of a traffic channel and
- indicating within said certain transmission burst that it contains symbols carrying signalling information.

The invention applies also to a transmitting device which is characterized in that it comprises means for carrying out the above-mentioned steps.

The invention is based on the insight that it is not necessary to bring the interleaving down to the bitwise alternation between user data and signalling information. The interleaving algorithms may be designed so that the signalling information reserves continuous blocks from the transmission bursts. A very simple solution is to allocate complete transmission bursts to the fast signalling purposes according to need. Another possibility is to use the fact that in many systems a transmission burst is divided into two temporally separate halves by a training sequence at the middle of the transmission burst, so one of the halves may be allocated to fast signalling information and the other to user data. The invention allows even the use of smaller continuous symbol blocks within the transmission frames for conveying fast signalling information, but the smaller the size of the continuous block the closer the solution gets to the disadvantages of directly copying the existing FACCH practice from GSM.

The indication of the contents of a transmission burst as either fast signalling information or user data may be accomplished through the use of stealing symbols like in the prior art solutions. However, one may also take advantage of the phase rotation characteristics associated with the different modulation methods by using the rotation of the constellation points in the phase space as an indication of the transmission burst contents. Each transmission burst contains a training sequence the symbol content of which is known, so a receiver can use the received form of the training sequence to find out a correct phase derotation angle. Associating a certain unique phase rotation angle to each modulation method is thus a feasible way of conveying a piece of simple modulation-related information.

A lower-level modulation method generally allows the use of higher transmission power, because the nonlinear phase characteristics of the transmitter's power amplifier have a relatively smaller distorting effect on the signal. Therefore the invention allows also the enhancement of the fast signalling performance by transmitting the signalling information with a higher transmission power than the corresponding user data.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
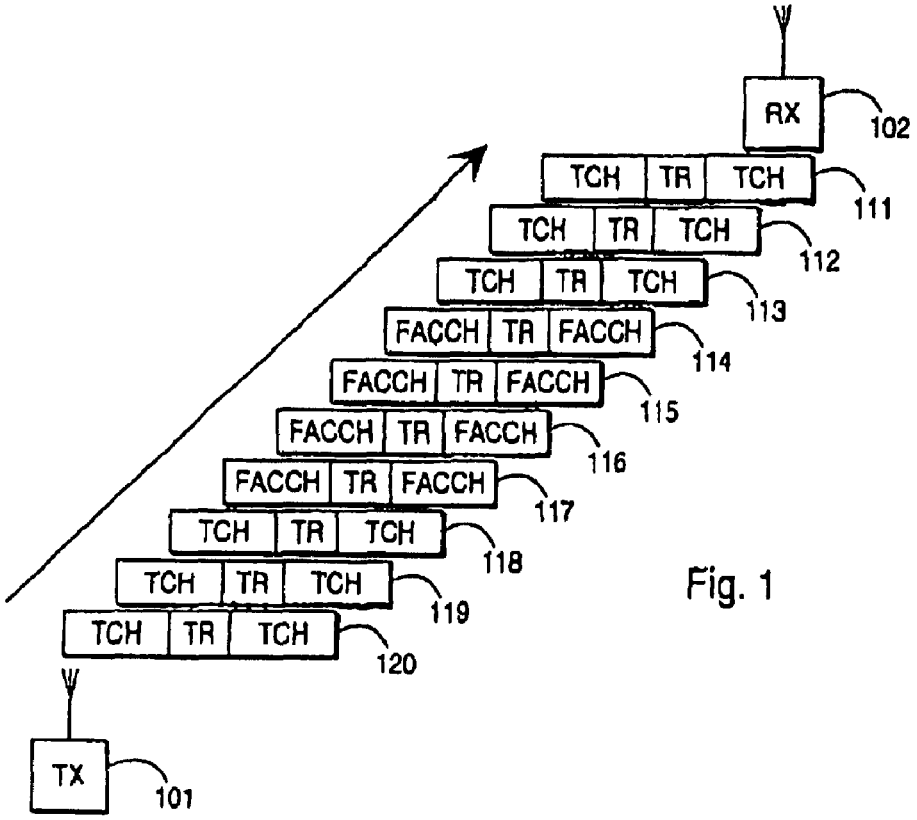
FIG. 1 illustrates the transmission of fast signalling information according to a first embodiment of the invention.

FIG. 1 shows schematically a transmitting device 101, a receiving device 102 and number of transmission bursts 111 to 120 transmitted from the former to the latter. We assume that previously a traffic channel or TCH has been established between the devices for transmitting some kind of user data. We also assume that in the middle of the user data transmission a piece of fast signalling information has to be transmitted. Further we assume that the amount of fast signalling information is such that in the channel encoded form it would completely fill four transmission bursts. Comparing to the known FACCH terminology of GSM this means that there is a single FACCH frame to be transmitted.

According to the embodiment of FIG. 1, four complete consecutive transmission bursts 114, 115, 116 and 117 are "stolen" from the traffic channel to transmit the fast signalling information. Taken that a different modulation method will be used to transmit the fast signalling information than the user data, allocating complete transmission bursts has the advantage that the allocation requires the transmitting device 101 to reconfigure its modulator (not separately shown) only twice—between transmission bursts 113 and 114 and between transmission bursts 117 and 118. Also the receiving device 102 has to reconfigure its demodulator (not separately shown) only twice, with plenty of time to do so. This is definitively more advantageous than the prior art alternative of applying a different modulation method to every second symbol in a number of transmission bursts. It must be noted, however, that the transmission bursts shown in FIG. 1 relate only to a single connection: if we suppose that the transmitting device 101 is a base station it may have dozens of simultaneous connections active at any given moment. The specifications of ECSD state that a transmission frame consists of eight time slots, so on a given frequency a base station may need to transmit up to seven other transmission bursts between each pair of consecutive transmission bursts in FIG. 1. Depending on the data rate used in each connection, the base station may need to reconfigure its modulator to a different modulation method even after every transmission burst in a transmission frame. Under some specific conditions there may be even more than one transmission burst—with an associated change of modulation method—within a single time slot.

The number of transmission bursts that must be stolen from the traffic channel to the transmission of fast signalling information is not limited by the invention: it depends on the amount of fast signalling information to be transmitted and on the amount of channel coding applied to encode the fast signalling information. Also the invention does not require that the stolen transmission bursts are consecutive for example every second or every third transmission burst or any number of N transmission bursts from M, where N<M, in any order could be stolen. However not stealing consecutive transmission bursts will at least partly eliminate the advantage of having to change the modulation/demodulation method only few times. Spreading the transmitted fast signalling information over a large number of transmission bursts also causes delay in getting the complete set of fast signalling information through to the receiving device.

Figure 2:
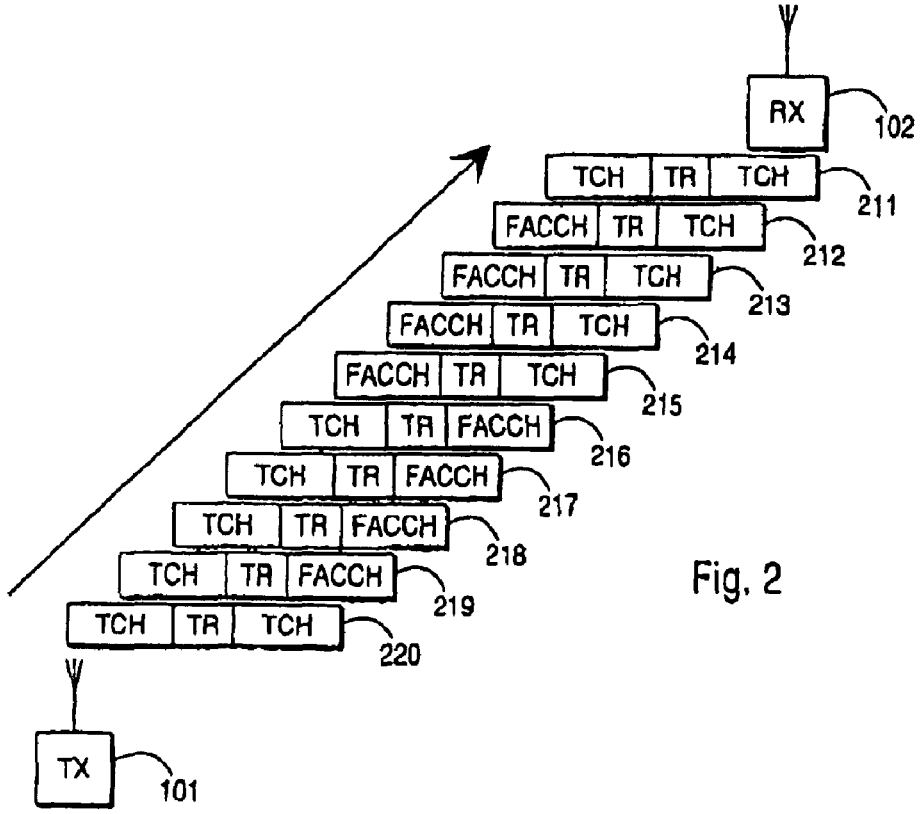
FIG. 2 illustrates the transmission of fast signalling information according to a second embodiment of the invention.

FIG. 2 illustrates an alternative embodiment where the transmitting device 101 and receiving device 102 are essentially the same but from the transmission bursts 211 to 220, one physical half of the bursts 212 to 219 is allocated to fast signalling information. Physical half means that when there is a training sequence in the middle of each transmission burst, all symbols preceding the training sequence (as in transmission bursts 212 to 215) or all symbols following the training sequence (as in transmission bursts 216 to 219) are allocated. This embodiment requires several changes between modulation/demodulation methods, but it is still more advantageous than changing the modulation/demodulation method after each symbol. It has also the advantage of not cutting completely the transmission of user data for the duration of several frames as in the embodiment of FIG. 1. Again the invention does not limit the number of transmission bursts of which one half is allocated to fast signalling information, nor the order in which the first and second halves are allocated. Between the transmission bursts from which one half is allocated to fast signalling information there may be complete user data bursts.

Basically the invention allows even for smaller blocks of transmission bursts to be allocated to fast signalling information: for example the K last symbols (where K is an integer smaller than the number of symbols in one half of a transmission burst) of each transmission burst for the duration of P transmission bursts (where P is a positive integer)

could be allocated. However, allocating complete transmission bursts or physical burst halves is regarded as more advantageous, because in these embodiments the limits of the allocated symbol block are very clearly defined.

Figure 3:
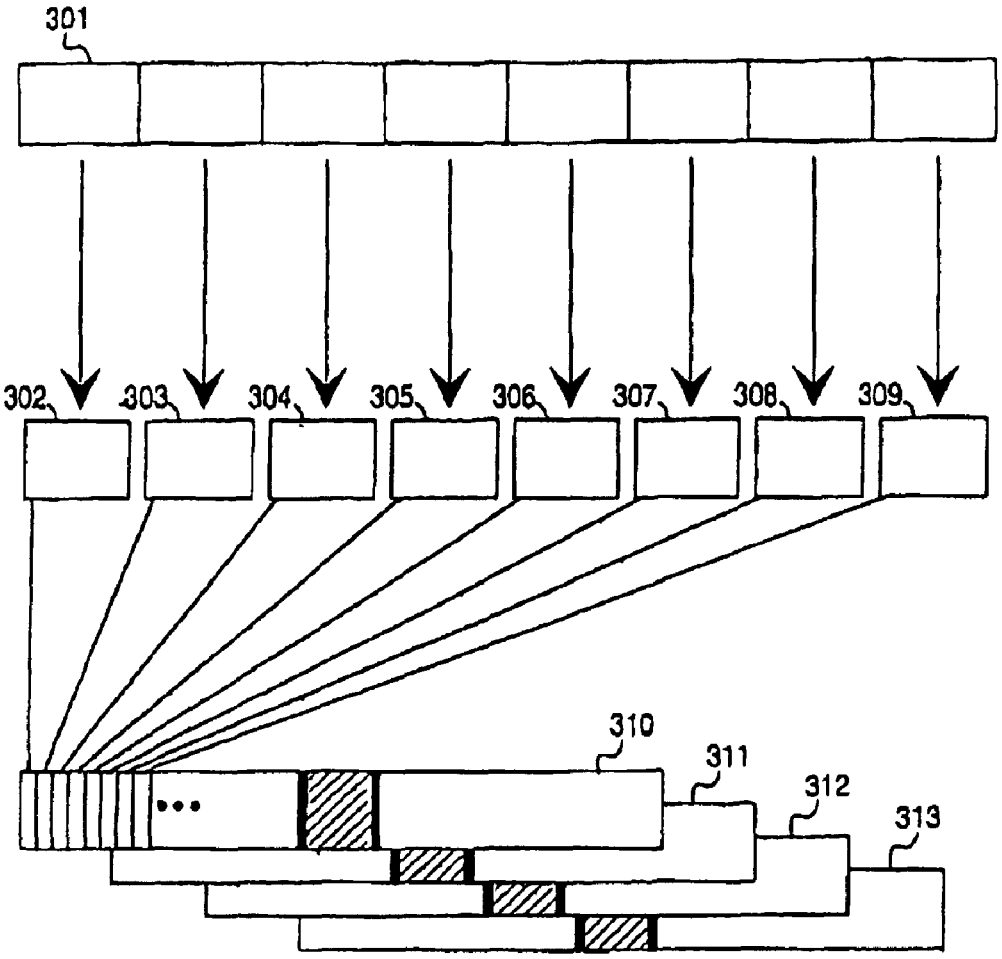
FIG. 3 illustrates a possible interleaving scheme that can be used in connection with the embodiment of FIG. 1.

FIG. 3 illustrates schematically an advantageous method for interleaving the contents of a fast signalling information frame 301 to a number of transmission bursts. We assume that the method of FIG. 1 is used, whereby the contents of the fast signalling information frame 301 will completely fill four transmission bursts 310 to 313. In FIG. 3, the frame is first split into eight groups 302 to 309 each having an equal number of symbols. The symbol positions in the "stolen" transmission bursts are then filled in order by first taking the first symbol from each group as illustrated by lines in FIG. 3, then taking the second symbol from each group and so on. In other words, the symbols from the nth group (where n goes from 1 to 8) take the positions n, n+8, n+16 and so on. FIG. 3 also shows the training sequence as a hatched block in the middle of each transmission burst 310 to 313, as well as a pair of stealing flag indicator symbols shown in solid black, one on each side of each training sequence. The interleaving method of FIG. 3 is naturally only exemplary, and a number of other interleaving methods are applicable.

There are basically two ways of indicating, which transmission bursts and which parts of them comprise fast signalling information instead of user data. Stealing flag indicator symbols were already mentioned above, meaning that the value of a first stealing flag indicates whether a first half of the transmission burst contains fast signalling information and the value of a second stealing flag similarly indicates whether a second half of the transmission burst contains fast signalling information. We will describe an alternative method of implementing the indication with reference to FIG. 4.

Figure 4:
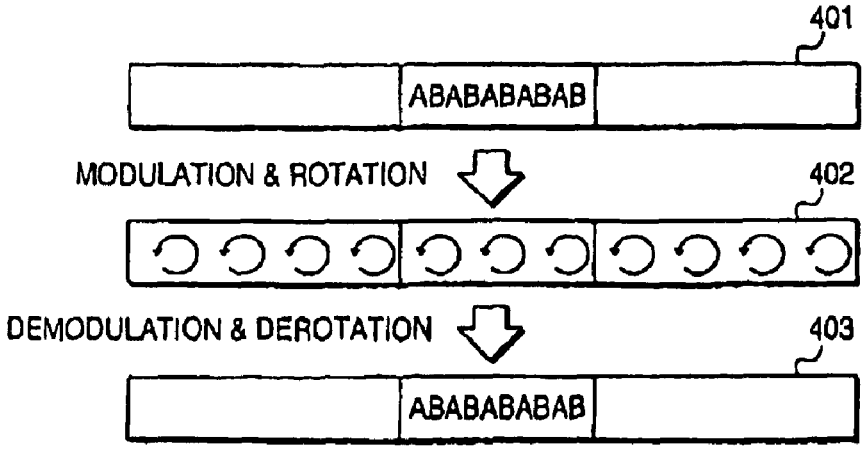
FIG. 4 illustrates the use of phase rotation to identify some characteristics of a transmission burst.
Figure 5:
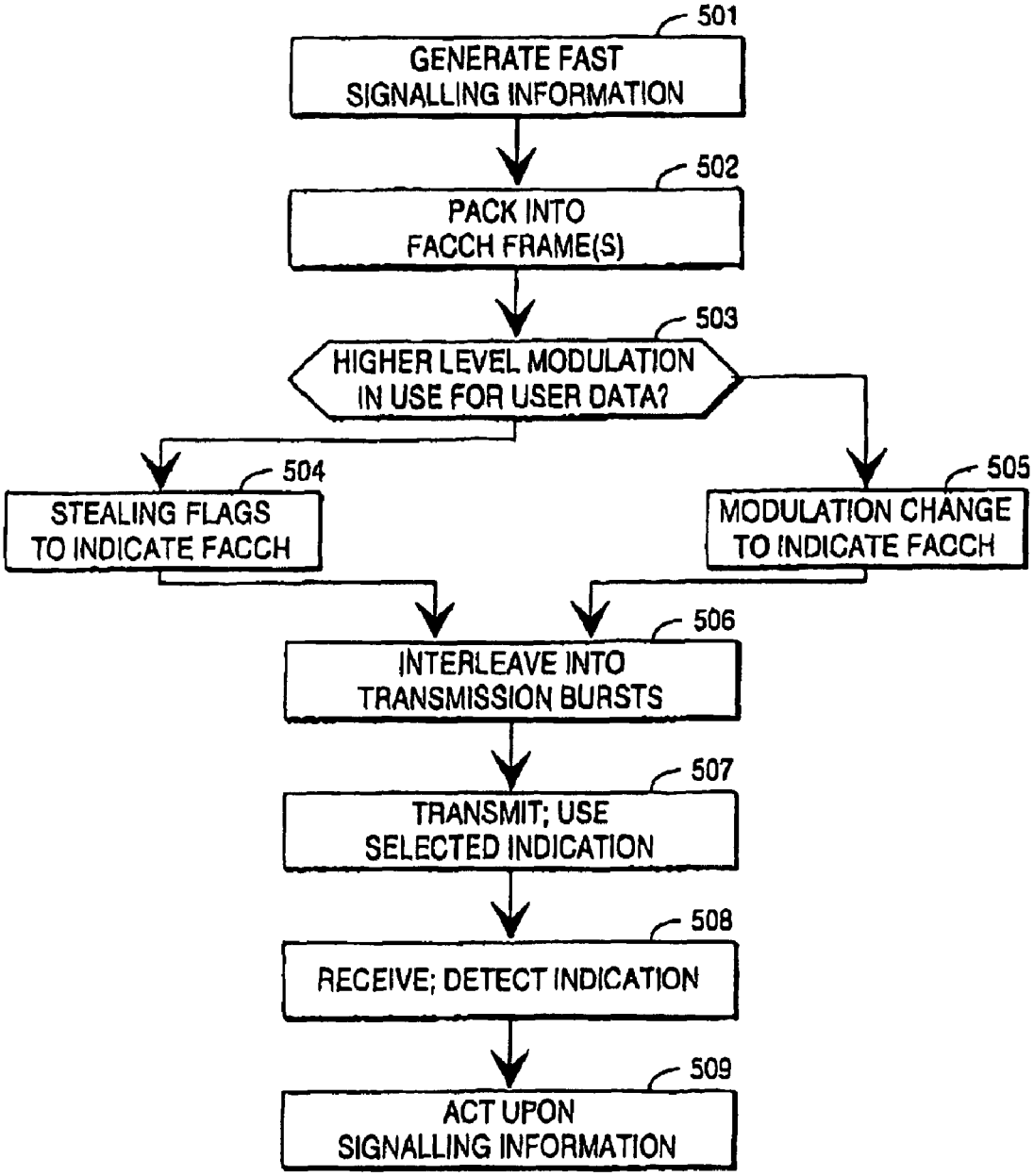
FIG. 5 is a schematic illustration of a method according to an embodiment of the invention and FIG. 6 is a schematic illustration of the hardware associated with an embodiment of the invention.

FIG. 4 illustrates an assembled transmission frame 401 in the form which it has in a transmitting device before modulation onto a carrier frequency. In the middle of the transmission burst there is a training sequence which consists of a string of known consecutive symbols. The schematic indication ABABAB . . . has been used for the known form of the training sequence. The modulation step is accompanied with a phase rotation which may an inherent consequence of the applied modulation algorithm or which may be introduced deliberately as an addition to the actual modulation. An exemplary way of applying phase rotation is the following. According the 8-PSK modulation principle there are eight allowed phase angle values for the modulated signal, e.g. 0, $\pm\pi/4$, $\pm\pi/2$, $\pm\pi4$, $\pi$. Each of them corresponds to a particular set of three consecutive bits in the data stream to be transmitted: for example the bit combination (0,1,0) corresponds to a phase angle value $+\pi/2$. A constant phase rotation by X radians may be specified so that each symbol generated according to the basic modulation principle will be additionally rotated by X radians in the phase space. For example defining $X=+3\pi/8$, the final phase modulated symbol that will represent the bit combination (0,1,0) in the transmitted signal will have the phase angle value $+7\pi/8$.

In FIG. 4 the modulated, phase rotated and transmitted transmission frame 402 consists of phase rotated symbols. A receiving device must perform demodulation and derotation operations to restore the original information contents 403 of the transmission frame. Note that the receiving device knows beforehand the form of the training sequence, so it may deduce that the correct phase derotation angle is the one which causes the training sequence to acquire its correct original form.

If a certain first phase rotation scheme is applied to transmit complete bursts containing user data, and a certain second phase rotation scheme is used to transmit complete bursts containing fast signalling information, no other indication mechanism is actually needed a receiving device recognises the used phase rotation scheme by finding out which phase derotation scheme produces the correct form of the training sequence and deduces therefrom the nature of the contents of the transmission burst. If, on the other hand, the phase rotation scheme is independent of the contents of the transmission burst or only a part of the transmission burst contains fast signalling information, a stealing flag mechanism is needed for the indication.

To summarize, we may state that the invention allows for the following indication mechanisms:

- use different phase rotation schemes and no separate stealing flag indicator symbols;
- use same phase rotation scheme and separate stealing flag indicator symbols; or
- use different phase rotation schemes and as a back-up separate stealing flag indicator symbols.

If stealing flag indicator symbols are used, it is most advantageous to choose their two allowed values so that they correspond to opposite points in the constellation diagram.

The question of possible confusion between the GMSK-modulated fast signalling information bursts and possible other GMSK-modulated bursts deserves to be briefly mentioned. It has been proposed that a slow associated control channel or SACCH would use GMSK modulation in ECSD. To prevent confusion it is necessary that such an SACCH uses only certain previously known transmission bursts. If the model of GSM is followed, the SACCH will have a number of fixedly allocated slot positions in each cell, so as long as the fixed slot allocations are obeyed there is no danger of the SACCH bursts to get mixed with potential GMSK modulated fast signalling information bursts. The same applies to potential other bursts to which the same modulation method will be applied.

A transmitting device in a cellular radio network typically has a certain upper limit of allowed transmission power for each transmission burst. If the embodiment of FIG. 1 (allocation of complete bursts to fast signalling information) is used, it is possible to use a higher transmission power to transmit the bursts stolen to the use of fast signalling information than the regular bursts. This is due to the fact that the nonlinearity of a transmission power amplifier (especially in a base station) will become more evident if a multilevel phase modulation method is used than with a binary modulation method, imposing a mandatory 2-4 dB back-off at the highest 8-PSK transmission power levels. Not having to impose the back-off when transmitting the fast signalling information is a remarkably advantage, because the highest power levels relate to the situations where a terminal is near a cell border, and the fast signalling information often carries handover-related information which should be received as faultlessly as possible.

It should be noted that using higher downlink transmission power levels for fast signalling information will affect the received power measurements and reporting performed by the mobile stations. The network must compensate for the corresponding unreasonably high measurement results. The techniques for implementing such compensation are within the normal capabilities of a person skilled in the art.

Figure 6:
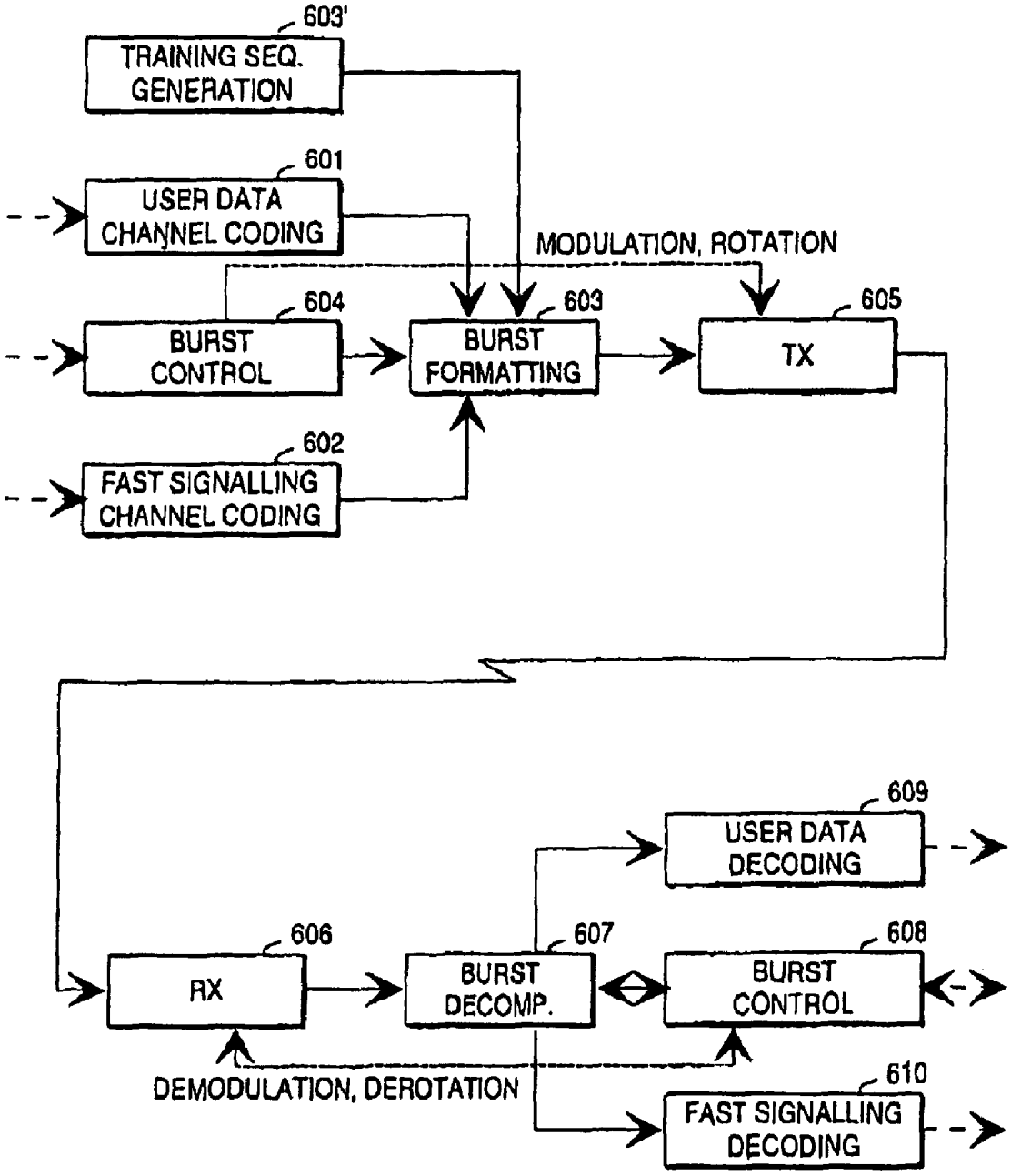

We will conclude by briefly describing the effect of the invention on the structure and functions of transmitting and receiving devices such as base stations and terminals of a cellular radio network. As illustrated in the upper part of FIG. 6 a transmitting device comprises a user data channel encoder block 601, a fast signalling channel encoder block 602 and a burst formatting block 603 to pack the channel encoded symbols into bursts. The latter operates under the command of a burst formation control block 604 and may receive the correct form of the training sequence from a training sequence generator 603'. The inputs to the channel encoder blocks come in a known way from user data formation (e.g. microphone and speech encoder in a telephone) and fast signalling data formation (a control processor), and the burst formation control is typically a subblock of a larger system control block. The formatted bursts are transmitted by a transmitter block 605 which applies the modulation and phase rotation methods commanded by the burst formation control block 604.

In a receiving device a receiver block 606 receives the transmitted bursts and converts them into baseband symbol sequences using the demodulation method commanded again by a control block 608. The burst decomposition block 607 strips the received bursts from training sequences and other overhead information and submits the actual user data symbols to the user data channel decoding block 609 and, the fast signalling information symbols to the fast signalling channel decoding block 610. The operation of the control block 608 depends on which information it has received from the receiver block in the form of detected phase rotation characteristics and/or from the burst decomposition block 607 in the form of stealing flag indicator symbol values. The decoding blocks 609 and 610 are in a known way coupled to the parts of the receiving device where the decoded user data and signalling information is needed, and the control block 608 is again typically a part of a larger system control functionality.

According to the invention the blocks 604 and 603 in the transmitting device are arranged to allocate complete transmission bursts or burst halves to the use of fast signalling information; additionally the control block 604 is arranged to command the transmitter to use a binary phase modulation method for the fast signalling information symbols. In the receiver the blocks 607 and 608 are correspondingly arranged to divert complete fast signalling bursts or burst halves to block 610 when they appear. If the phase rotation based indication mechanism is used, the receiver block 606 is also arranged to detect the phase rotation characteristics of the received symbols and to announce them to the control block 608.

Although ECSD has been mentioned as the primary area of application for the invention, the invention is equally applicable to all such cellular radio networks and systems where two modulation levels of different depth are available to transmit user data and fast signalling information, and where additionally the transmission of fast signalling information takes place using capacity "stolen" from the user data.

The invention claimed is:

1. A method for conveying signalling information from a transmitting device to a receiving device in a cellular radio network where user data transmission takes place on a traffic channel in discrete transmission bursts consisting of consecutive symbols, comprising the steps of:

formatting a piece of signalling information into symbols, transmitting the symbols carrying the signalling information as a block of consecutive symbols in a certain transmission burst of a traffic channel and indicating within said certain transmission burst that it contains symbols carrying signalling information.

2. A method according to claim 1, wherein the step of transmitting the symbols carrying the signalling information comprises the substep of filling a complete transmission burst with the symbols carrying the signalling information.

3. A method according to claim 2, wherein the step of transmitting the symbols carrying the signalling information comprises the substep of filling a number of consecutive complete transmission bursts with the symbols carrying the signalling information.

4. A method according to claim 2, wherein the step of transmitting the symbols carrying the signalling information comprises the substep of filling a number of non-consecutive complete transmission bursts with the symbols carrying the signalling information.

5. A method according to claim 1, wherein additionally a transmission burst consists of a first half, a training sequence and a second half, and the step of transmitting the symbols carrying the signalling information comprises the substep of filling exactly one half of a transmission burst with the symbols carrying the signalling information.

6. A method according to claim 5, wherein the step of transmitting the symbols carrying the signalling information comprises the substep of filling exactly one half of each of a number of consecutive complete transmission bursts with the symbols carrying the signalling information.

7. A method according to claim 5, wherein the step of transmitting the symbols carrying the signalling information comprises the substep of filling exactly one half of each of a number of non-consecutive complete transmission bursts with the symbols carrying the signalling information.

8. A method according to claim 1, wherein additionally a first phase modulation method of first modulation depth is used to generate the symbols carrying user data in a transmission burst, and the step of formatting a piece of signalling information into symbols comprises the substep of using a second phase modulation method of second modulation depth, lower than said first modulation depth, to generate the symbols carrying signalling information in a transmission burst.

9. A method according to claim 8, wherein said first modulation method is 8-PSK and the second modulation method is GMSK.

10. A method according to claim 8, wherein a first phase rotation scheme is used to generate the symbols with the first modulation method and a second phase rotation scheme is used to generate the symbols with the second modulation method, said second phase rotation scheme being essentially indistinguishable from the first phase rotation scheme.

11. A method according to claim 10, wherein to indicate within a certain transmission burst that it contains symbols carrying signalling information, the method comprises the step of placing a number of flag symbols having a certain indicator value within said transmission burst.

12. A method according to claim 11, wherein additionally a transmission burst consists of a first half, a training sequence and a second half, and only one half of a transmission burst is filled with the symbols carrying the signalling information, and the method comprises the step of placing two flag symbols within said transmission burst to indicate which half of the transmission burst contains symbols carrying signalling information.

13. A method according to claim 8, wherein a first phase rotation scheme is used to generate the symbols with the first modulation method and a second phase rotation scheme is used to generate the symbols with the second modulation method, said second phase rotation scheme being essentially distinguishable from the first phase rotation scheme; and the use of the second phase rotation scheme indicates within a certain transmission burst that it contains symbols carrying signalling information.

14. A transmitting device for transmitting signalling information to a receiving device in a cellular radio network over a traffic channel in discrete transmission bursts consisting of consecutive symbols, comprising:

means for formatting a piece of signalling information into symbols, means for transmitting the symbols carrying the signalling information as a block of consecutive symbols in a certain transmission burst of a traffic channel and means for indicating within said certain transmission burst that it contains symbols carrying signalling information.

15. A transmitting device according to claim 14, comprising a dual-mode phase modulator for applying a first phase modulation method of first modulation depth to generate the symbols carrying user data in a transmission burst and a second phase modulation method of second modulation depth, lower than said first modulation depth, to generate the symbols carrying signalling information in a transmission burst.

*16. A receiving device for receiving signalling information from a transmitting device in a cellular radio network where user data transmission takes place on a traffic channel in discrete transmission bursts consisting of consecutive symbols, comprising:*

*an indication receiver configured to read from within a transmission burst of a traffic channel an indication that the transmission burst contains symbols carrying signalling information;*

*a receiver configured to receive the symbols carrying the signalling information as a block of consecutive symbols in the transmission burst; and*

*a decomposer configured to derive a piece of signalling information from the received symbols.*

*17. A receiving device according to claim 17, comprising a dual-mode phase modulator for applying a first phase modulation method of a first modulation depth to receive the symbols carrying user data in a transmission burst and a second phase modulation method of a second modulation depth, lower than the first modulation depth, to receive the symbols carrying signalling information in a transmission burst.*

*18. A transmitting device for transmitting signalling information to a receiving device in a cellular radio network over a traffic channel in discrete transmission bursts consisting of consecutive symbols, comprising:*

*a formatter configured to format a piece of signalling information into symbols;*

*a transmitter configured to transmit the symbols carrying the signalling information as a block of consecutive symbols in a certain transmission burst of a traffic channel; and*

*an indication formatter configured to indicate within the certain transmission burst that it contains symbols carrying signalling information.*

*19. A transmitting device according to claim 18, comprising a dual-mode phase modulator for applying a first phase modulation method of a first modulation depth to generate the symbols carrying user data in a transmission burst and a second phase modulation method of a second modulation depth, lower than the first modulation depth, to generate the symbols carrying signalling information in a transmission burst.*

* * * * *